United States Patent [19]

Kimura et al.

[11] Patent Number: 5,362,788
[45] Date of Patent: Nov. 8, 1994

[54] AQUEOUS COVERING COMPOSITION

[75] Inventors: Itsuo Kimura; Kazuhiro Fujiwara; Shigeki Hikasa, all of Iwakuni, Japan

[73] Assignee: Nippon Paper Industries Co., Ltd., Tokyo, Japan

[21] Appl. No.: 31,193

[22] Filed: Mar. 12, 1993

[30] Foreign Application Priority Data

Mar. 18, 1992 [JP] Japan .................................. 4-092008

[51] Int. Cl.$^5$ ................................................ C08K 5/06
[52] U.S. Cl. ................................... 524/377; 524/388; 524/500; 524/504; 524/517; 524/522; 524/548; 524/556; 525/74; 525/78
[58] Field of Search ............... 524/500, 504, 517, 522, 524/388, 377, 548, 556; 525/74, 78

[56] References Cited

U.S. PATENT DOCUMENTS

| | | |
|---|---|---|
| 3,255,130 | 6/1966 | Keim et al. |
| 4,174,333 | 11/1979 | Ohdairo et al. .............. 524/504 X |
| 4,283,322 | 8/1981 | Temple . |
| 4,299,754 | 11/1981 | Shiomi et al. . |
| 4,775,713 | 10/1988 | Homma et al. . |
| 4,946,895 | 8/1990 | Ohmae et al. . |
| 4,978,707 | 12/1990 | Tanaka et al. ..................... 524/504 |

FOREIGN PATENT DOCUMENTS

| | | |
|---|---|---|
| 0396055 | 11/1990 | European Pat. Off. . |
| WO 90 12656 | 11/1990 | WIPO . |

*Primary Examiner*—Judy M. Reddick
*Attorney, Agent, or Firm*—Oblon, Spivak, McClelland, Maier & Neustadt

[57] ABSTRACT

An aqueous composition for covering a polyolefin resin substrate consists essentially of a dispersion of a graft copolymer in which from 1 to 20% by weight, based on the graft copolymer of an $\alpha,\beta$-unsaturated dicarboxylic acid or acid anhydride thereof is grafted onto a propylene-$\alpha$-olefin polymer, a neutralizing base and a polyol in water.

10 Claims, No Drawings

AQUEOUS COVERING COMPOSITION

BACKGROUND OF THE INVENTION

The present invention relates to an aqueous covering composition suitable for the applications to primer and paint to be used on painting polyolefinic resin moldings and containing no aromatic organic solvent at all.

Polyolefinic resins such as polypropylene have been used in large amounts for electrical appliances in house, parts of car, etc. because of excellent properties and low price. However, polyolefinic resins have a drawback of difficult painting and adherence due to nonpolarity. For this reason, it is common to use a primer having chlorinated polyolefin as a major ingredient at the time of painting and adhering polyolefinic resins. However, since chlorinated polyolefin only dissolves into aromatic organic solvents such as toluene and xylene, large amounts of aromatic organic solvent cannot help being used, which has been a problem from the aspects of safety and hygiene and environmental pollution.

Hence, attempts to produce aqueous dispersion of chlorinated polyolefin have been made and they are disclosed for example, in Japanese Unexamined Patent Publication No. Hei 1-153778, No. Hei 1-256556, Hei 2-284973, etc. In these, however, aromatic organic solvents are used on production and it was difficult to eliminate them completely. Also. attempts to produce aqueous dispersion of modified polyolefin have been made, which are disclosed, for example in Japanese Unexamined Patent Publication No. Sho 59-47244, No. Hei 2-286724, etc. They have, however, drawbacks such as poor adhesive property to polyolefin resin, poor water resistance and poor paintability and such aqueous compositions have not yet been put into practice.

As described, it is necessary to give the primer treatment to perform the painting and adhesion to polyolefinic resin, but the production of aqueous composition for paint containing no aromatic organic solvent at all and having good adhesive property to polyolefinic resin has been difficult technically. The purpose of the invention is provide an aqueous composition which solves such problematic points and can improve the paintability and adhesive property of polyolefinic resin.

As a result of extensive studies to achieve the purpose aforementioned, the inventors have reached the invention.

SUMMARY OF THE INVENTION

A constitutional element dispersed (a) a resin graft copolymerized $\alpha,\beta$-unsaturated dicarboxylic acid or its acid anhydride onto propylene-$\alpha$-olefin copolymer in amounts of 1 to 20% by weight, a neutralizing base and (b) a polyol into water has made it possible to obtain an aqueous covering composition for polyolefinic resin accomplishing said purpose.

DETAILED DESCRIPTION OF THE INVENTION

In following, the invention will be illustrated in detail.

The propylene-$\alpha$-olefin copolymer of component (a) in the aqueous covering composition of the invention is a random copolymer or block copolymer of propylene with $\alpha$-olefin and the random copolymer is more preferable than block copolymer. As $\alpha$-olefins, ethylene, butene-1, pentene-1, hexene-1, etc. can be mentioned and two or more kinds of these may be copolymerized. Among these, ethylene or 1-butene is preferable from the point of physical properties of resin. Moreover, the proportion of propylene component is preferable to be not less than 55 mol %. If less than 55 mol %, then the adhesive property to polypropylene is poor, which is unpreferable.

For $\alpha, \beta$-unsaturated dicarboxylic acids or their acid anhydrides to be graft copolymerized onto propylene-$\alpha$-olefin copolymer, for example, maleic acid, fumaric acid, itaconic acid, citraconic acid, allylsuccinic acid, mesaconic acid and aconitic acid, and their acid anhydrides can be listed as some of the samples. The amount for graft copolymerizing $\alpha,\beta$-unsaturated dicarboxylic acid or its acid anhydride is preferable to be 1 to 20% by weight. If under 1% by weight, the stability on having dispersed into water will become poor and, if over 20% by weight, the grafting efficiency will become low, which is uneconomical. Two to ten % by weight is particularly preferable.

Moreover, the weight average molecular weight of resin graft copolymerized $\alpha,\beta$-unsaturated dicarboxylic acid or its acid anhydride is preferable to be 3000 to 35000. If under 3000, the cohesion will be insufficient resulting in poor adhesive force to polyolefinic resin and, if over 35000, the manipulability on dispersing into water will become poor, which is unpreferable. Bringing the molecular weight in this range is possible by selecting the molecular weight of raw material or the conditions at the time of conducting grafting reaction, and it can also be performed in the way that, after once decreased the molecular weight of raw material, grafting reaction is conducted. Besides, the weight average molecular weight can be determined by GPC (gel permeation chromatography).

Graft copolymerization of $\alpha,\beta$-unsaturated dicarboxylic acid or its acid anhydride onto propylene-$\alpha$-olefin copolymer may be conducted by a known method, but a particularly preferred method is to heat propylene-$\alpha$-olefin copolymer above its melting point and then graft copolymerize the $\alpha,\beta$-unsaturated dicarboxylic acid or its anhydride onto molten propylene-$\alpha$-olefin copolymer in the presence of a radical-generating agent.

In the case of this method, using a reactor equipped with intensive agitator, Banbury mixer, kneader, extruder or the like, $\alpha,\beta$-unsaturated dicarboxylic acid or its acid anhydride and radical-generating agent are added at a temperature of not lower than about 150° C. to not higher than about 300° C. to react, and the product is pelletized by publicly known method.

As an alternative method, it is also possible to perform by such a method that the propylene-$\alpha$-olefin copolymer is dissolved into organic solvent such as xylene under heat and the reaction is conducted in the presence of a radical-generating agent, but this method is unpreferable because it is time-consuming to remove the organic solvent and the organic solvent is sometimes left behind.

The radical-generating agent to be used for the reaction can be appropriately selected from publicly known materials, but the organic peroxides is particularly preferable. As the organic peroxides, for example, benzoyl peroxide, dicumyl peroxide, lauroyl peroxide, 2,5-dimethyl-2,5-di(t-butylperoxy)hexine-3, di-t-butyl peroxide, t-butyl hydroperoxide, t-butyl peroxybenzoate, cumene hydroperoxide, etc. can be metioned, which are selected for use depending on the reaction temperature.

For the polyols of component (b), materials in wide range such as diol, polyoxyalkylenediol, hydroxy-terminated polybutadiene, polyvalent alcohols such as glycerin, polyesterpolyol, acrylpolyol, polyurethanepolyol and bisphenol A can be used. For example, ethylene glycol, diethylene glycol, triethylene glycol, propylene glycol, di-propylene glycol, butanediol, pentanediol, hexanediol, glycerin, etc, can tie mentioned. Thereamong, polyols with strong hydrophilicity are desired.

Moreover, the molecular weight of polyol is preferable to be not more than 1000. If over 1000, the stability of composition dispersed into water will become poor, which is unpreferable.

This polyol is preferable to be used in a proportion of 4 to 200 parts by weight per 100 parts by weight of component (a). If under 4 parts by weight, then the manipulation to disperse into water is hard to do and the flexibility of paint film decreases, which is unpreferable depending on the application. If over 200 parts by weight, then the water resistance of the film foamed with this composition is in danger of becoming poor.

The reason why component (a) is neutralized with base is for ionizing carboxyl group, thereby achieving good dispersion into water. As the bases, sodium hydroxide, potassium hydroxide, ammonia, methylamine, ethylemine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, morpholine, etc. can be exemplified.

Since the degree of hydrophilicity of resin differs depending on the types of base to be used, it is necessary to select appropriately depending on the conditions, but amines having hydroxyl group such as ethanolamine and 2-amino-2-methyl-1-propanol are preferable due to strong hydrophilicity. The amount of base used is suitable to be in a range of 0.3 to 1.5 times as much as the equivalent weight to carboxyl group of component (a) and 0.5 to 1.2 times are preferable.

Dispersing components (a) and (b) into water can be performed by a method wherein component (a) is allowed to melt by heating it to a temperature of above melting point, component (b) and base and, if need be, surfactant are added, and water is added to the mixture of these while agitating, a method wherein inversely the mixture of these is added to water, a method wherein all components including water are mixed and agitated under heat, and the like. Moreover, if performing at high temperature and under pressure, the dispersion with good stability can be obtained.

Dispersing is possible with or without using surfactant, but it is desirable to use when the amount of $\alpha,\beta$-unsaturated dicarboxylic acid or its acid anhydride having been graft copolymerized is low. The use level is preferable to be not more than 25% to component (a). If over 25%, the water resistance of paint film will become poor.

For the surfactant, any type can be used, but nonionic surfactant is desirable because of low toxicity, and, using this mainly, anionic surfactant or fluorosurfactant may be used in combination.

As the nonionic surfactants, polyoxyethylene alkyl ester, polyoxyethylene alkyl ether, polyoxyethylene alkylphenyl ether, sorbitan alkyl ester, polyglycerine ester, etc. can be exemplified.

As the anionic surfactants, carboxylate, sulfonate, salt of sulfate, salt of phosphate, etc. are mentioned. For the fluorosurfactants, all off anionic, nonionic and cationic types can be used. In addition to these, pluronic type can also be used as a high molecular surfactant.

The inventive composition dispersed into water in this way is excellent in the adhesive property to polyolefin, in particular, polypropylene and excellent as a primer on painting and adhesion. Also, the stability is good. Further, the flexibility appears in the paint film which is preferable. The aqueous covering composition of the invention may be blended with pigments as it is and may be blended with other aqueous resin components. It can be painted onto the substrate resin by roll coating, spraying, brush coating, etc. It is also possible to use as an upper coating paint by adding other components.

The aqueous covering composition of the invention contains propylene-$\alpha$-olefin copolymer graft copolymerized with $\alpha,\beta$-unsaturated dicarboxylic acid or its acid anhydride as one of components, hence it is excellent in the adhesive property to polyolefin. Moreover, it has polyol as a component, and, by neutralizing this with base, it was made possible to convert to aqueous dispersion, which has been difficult hitherto, providing also good stability.

In following, the invention will be illustrated concretely based on examples, but the invention is not confined to these.

PRODUCTION EXAMPLE 1

In a four-neck flask fitted with agitator, cooling tube and dropping funnel, 300 g of propylene-butene-ethylene copolymer (propylene component 68 mol %, butene component 24 mol % and ethylene component 8 mol %, weight average molecular weight 68000) was molten under heat. Then, keeping the temperature of system at 180° C. 25 g of maleic anhydride and 5 g of dicumyl peroxide were added dropwise each over 3 hours while agitating, and thereafter reaction was conducted for 3 hours. After the reaction, the reaction product was cooled to room temperature, and then it was thrown into large amounts of acetone for purification to obtain a graft copolymer with grafting amount of 4.8%. When measuring the molecular weight by GPC, it showed a weight average molecular weight of 26000.

For the measurement of weight average molecular weight, column TSK-GEL was attached to HLC-8020 made by Tosoh Corp. and the sample was dissolved into THF (tetrahydrofuran) to measure at 40° C. The molecular weight was determined from a calibration curve formed with polystyrene standard samples.

PRODUCTION EXAMPLE 2

By similar manipulation to Production example 1, 40 g of maleic anhydride and 8 g of di-t-butyl peroxide were reacted 300 g of propylene-ethylene copolymer (propylene component 75 mol %, weight average molecular weight 85000) to obtain a graft copolymer with grafting amount of 9.2%. The weight average molecular weight was 22000.

PRODUCTION OF EXAMPLE 3

By similar manipulation to Production example 1, maleic anhydride was graft reacted with propylene-ethylene copolymer (propylene component 50 mol %, weight average molecular weight 180000) to obtain a graft copolymer with grafting amount of 6.2%. The weight average molecular weight was 75000.

EXAMPLE 1

In a flask equipped with agitator, 150 g of ethylene glycol and 25 g of surfactant (Nonion NS-212, made by Nippon Oil and Fats Co.) were placed, mixed and heated to 100° C. and 100 g of graft copolymer of Production example 1 were added little by little while agitating intensively. After the graft copolymer melted, 4 g of ethanolamine were added. Keeping the temperature at 100° C., water of 90° C. was added little by little while agitating intensively. At the point of having added 300 g of water, contents where taken out. The contents showed a milky white liquor.

EXAMPLES 2 THROUGH 5

Performing similar manipulation to Example 1, resins of production examples were dispersed into water with formulation compositions shown in Table 1.

COMPARATIVE EXAMPLES 1 AND 2

By similar manipulation to example, resins were dispersed into water with formulation compositions shown in Table 1.

TABLE 1

[Figures indicate parts by weight]

| | Graft copolymer | | Polyol | | Surfactant | | Base | |
|---|---|---|---|---|---|---|---|---|
| Example 1 | Production example 1 | 100 | Ethylene glycol | 150 | NS-212 | 25 | Ethanolamine | 4 |
| Example 2 | Production example 1 | 100 | Butanediol | 8 | NS-212 | 25 | Ethanolamine | 4 |
| Example 3 | Production example 1 | 100 | Polyethylene glycol 400 | 180 | NS-212 | 25 | Ethanolamine | 6 |
| Example 4 | Production example 2 | 100 | Propylene glycol | 50 | NS-212 | 25 | Triethylamine | 5 |
| Example 5 | Production example 2 | 100 | Tetraethylene glycol | 200 | NS-212 | 10 | Morpholine | 6 |
| Comparative example 1 | Production example 1 | 100 | None | 0 | NS-212 | 25 | Ethanolamine | 4 |
| Comparative example 2 | Production example 3 | 100 | Ethylene glycol | 150 | NS-212 | 25 | Ethanolamine | 4 |

The stability of aqueous dispersions of Examples 1 through 5 and Comparative examples 1 and 2 after allowed to stand for 1 month are shown in Table 2.

EXAMPLES 6 THROUGH 10

Each of aqueous dispersions of Examples 1 through 5 were coated onto a polypropylene resin plate by spraying and dried for 30 minutes at 80° C. Next, two-component urethane upper coating paint was painted and, after allowed to stand for 10 minutes at room temperature, it was dried forcedly for 30 minutes at 80° C. using fan dryer. After the painted plate thus obtained was allowed to stand for a day at room temperature, tests of paint film were made. Results are shown in Table 2.

COMPARATIVE EXAMPLES 3 AND 4

Tests were made similarly to Examples 6 through 10. Results are shown in Table 2. Besides, in the case of Comparative example 3, the spray coating was impossible.

TABLE 2

| | Composition | Stability | Adhesive property | Gasoline resistance |
|---|---|---|---|---|
| Example 6 | Example 1 | Good | 100/100 | Good |
| Example 7 | Example 2 | Good | 100/100 | Good |
| Example 8 | Example 3 | Good | 100/100 | Good |
| Example 9 | Example 4 | Good | 100/100 | Good |
| Example 10 | Example 5 | Good | 100/100 | Good |
| Comparative example 3 | Comparative example 1 | Separation | — | — |
| Comparative example 4 | Comparative example 2 | Good | 60/100 | Peeling-off |

Besides, the test methods are as follows:

Adhesive Property

Nicks reaching the base were made on the surface of paint film with cutter to form a hundred cross-cuts at intervals of 1 mm. By closely contacting cellophane adhesive tape therewith and by peeling off in the direction of 180° C. the number of remaining cross-cuts was counted.

Gasoline Resistance

Nicks reaching the base were made on the surface of paint film and, after immersed into regular gasoline for 4 hours, the state of paint film was observed visually.

The aqueous covering composition of the invention is excellent in the adhesive property to polyolefin and has good stability and good flexibility of paint film. Yet, conversion to aqueous dispersion is possible without using aromatic organic solvent at all, hence the invention is excellent in the aspects of safety and hygiene and environmental pollution.

What is claimed is:

1. An aqueous composition for covering a polyolefin resin substrate, consisting essentially of:
 a dispersion of a graph copolymer in which from 1 to 20% by weight, based on the weight of graph copolymer, of an $\alpha,\beta$-unsaturated dicarboxylic acid or acid anhydride thereof is grafted onto a propylene-$\alpha$-olefin polymer, a neutralizing base and an alcohol having two or more OH groups in water.

2. The aqueous composition of claim 1, wherein the propylene component of said propylene-$\alpha$-olefin copolymer amounts to not less than 55 mol % of the copolymer.

3. The aqueous composition of claim 1, wherein the weight average molecular weight of said graft copolymer ranges from 3,000 to 35,000.

4. The aqueous composition of claim 1, wherein the molecular weight of said alcohol having two or more OH groups is not more than 1000.

5. The aqueous composition of claim 1, wherein the amount of said alcohol having two or more OH groups is 4 to 200 parts by weight per 100 parts by weight of graft copolymer resin.

6. The aqueous composition of claim 1, wherein said alcohol having two or more OH groups is a diol, a polyoxyalklenediol, a hydroxy-terminated polybutadiene, or a polyvalent alcohol.

7. The aqueous composition of claim 1, wherein said α-olefin is ethylene, butene-1, pentene-1 or hexane-1.

8. The aqueous composition of claim 1, wherein said α,β-unsaturated dicarboxylic acid is maleic acid, fumaric acid, itaconic acid, citraconic acid, allylsuccinic acid, mesaconic acid or aconitic acid.

9. The aqueous composition of claim 1, wherein said neutralizing base is sodium hydroxide, potassium hydroxide, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol or morpholine.

10. A method of preparing an aqueous covering composition for a polyolefin resin substrate, comprising:
neutralizing a graft copolymer in which from 1 to 20% by weight, based on the weight of graft copolymer, of an α,β-unsaturated dicarboxylic acid or anhydride thereof is grafted onto a propylene-α-olefin polymer with a base in the presence of an alcohol having two or more OH groups; and then dispersing the neutralized graft copolymer and said alcohol having two or more OH groups in water.

* * * * *